(12) United States Patent
Park

(10) Patent No.: US 7,571,530 B2
(45) Date of Patent: Aug. 11, 2009

(54) METHOD FOR MANUFACTURING COOKING VESSEL

(76) Inventor: Gee Woen Park, 1930 Tondolea Ln, La Canada, CA (US) 91011

(*) Notice: Subject to any disclaimer, the term of this patent is extended or adjusted under 35 U.S.C. 154(b) by 341 days.

(21) Appl. No.: 11/526,465

(22) Filed: Sep. 25, 2006

(65) Prior Publication Data

US 2008/0083747 A1 Apr. 10, 2008

(51) Int. Cl.
*B23P 25/00* (2006.01)
*B32B 15/20* (2006.01)
*A47J 27/00* (2006.01)

(52) U.S. Cl. .......................... 29/458; 29/460; 29/527.1; 29/527.2; 29/530; 72/379.2; 219/621; 220/573.1; 220/573.3; 220/912

(58) Field of Classification Search .................. 29/458, 29/460, 527.1, 527.2, 530; 220/573.1, 573.2, 220/573.3, 626, 912, 62.13, 62.17; 219/621; 72/347, 379.2, 379.4
See application file for complete search history.

(56) References Cited

U.S. PATENT DOCUMENTS

| | | | |
|---|---|---|---|
| 3,503,815 A * | 3/1970 | Johnson ....................... 228/159 |
| 3,825,993 A * | 7/1974 | McGinnis et al. ............ 228/101 |
| 3,919,763 A * | 11/1975 | Ulam ........................... 29/460 |
| 4,607,512 A * | 8/1986 | Deville ............................ 72/46 |
| 5,694,674 A * | 12/1997 | Flammang ..................... 29/460 |
| 5,809,630 A * | 9/1998 | Coissard ........................ 29/505 |
| 5,833,894 A * | 11/1998 | Lanzani et al. ............... 264/46.3 |
| 6,702,140 B1 * | 3/2004 | Sollo ......................... 220/573.3 |
| 6,715,631 B2 * | 4/2004 | Kim .......................... 220/573.1 |
| 7,337,518 B2 * | 3/2008 | Cheng ............................ 29/505 |
| 2005/0205646 A1 * | 9/2005 | Cheng .......................... 228/101 |

* cited by examiner

*Primary Examiner*—Jermie E Cozart
(74) *Attorney, Agent, or Firm*—Park & Associates IP Law LLC

(57) ABSTRACT

Provided is a method for manufacturing a cooking vessel having a bottom on which a plurality of engraving parts and embossing parts are formed in a concavo-convex shape. The method includes attaching a film having through-holes to a cut stainless plate; coating an ink layer on the film, impregnating an ink of the ink layer into the through-holes of the film, peeling off the film, and forming the ink layer; dipping the stainless plate having the ink layer in an erosion solution, and forming the engraving parts, by erosion, on a remnant surface of the stainless plate; and removing the ink layer from the stainless plate, pressing the stainless plate, and forming the vessel body having a housing part therein and having the engraving parts and the embossing parts on the bottom in the concavo-convex shape.

1 Claim, 3 Drawing Sheets

METHOD FOR MANUFACTURING COOKING VESSEL

FIELD OF THE INVENTION

The present invention relates to a cooking vessel, and more particularly, to a method for manufacturing a cooking vessel whose vessel body has a plurality of embossing parts and engraving parts on its bottom in a concavo-convex shape, thereby preventing a food from sticking during cooking.

BACKGROUND OF THE INVENTION

In general, each home uses various cooking vessels for the purpose of cooking a food. Under cooking circumstances, the cooking vessel, such as a pan and a frying pan, causes the food to stick to its surface and thus, cannot provide a clean cooking state. Alternately, the cooking vessel can create a harmful chemical reactant and can be eroded due to chemical properties of a variety of spices added during cooking. Products having a film layered on an inner surface of a cooking utensil and providing a non-stick function (that is, a function of preventing the food from sticking to the vessel surface) so as to prevent such circumstances are being widely used.

Korean Utility Model Registration No. 1937 (Korean Utility Model Application No. 91-16005) discloses a technology of coating a film on a cooking vessel. The Utility Model Registration No. 1937 discloses the cooking vessel such as a kettle, a pan, and a frying pan formed of aluminum or aluminum alloy. The cooking vessel has a ceramic layer and a Teflon layer sequentially layered on its inner surface, which is a cooking surface, thereby increasing a separation and an erosion resistance against the food, and keeping a good attachment of the Teflon layer.

The cooking vessel is manufactured by simply layering the ceramic layer or the Teflon layer on an inner surface of a base. Therefore, there occurs a phenomenon in which the ceramic layer and the Teflon layer are easily peeled off and damaged, suffering from an external impact or reaching a critical temperature during the cooking.

In other words, there is a drawback that a damaged portion of a coating layer consisting of the ceramic layer and the Teflon layer loses a non-stick effect, and is mixed with the food, thereby doing harm to a human body.

As above, the conventional cooking vessel is formed of aluminum considering good heat conductivity. The aluminum is weak in durability and thus, causes a drawback that the cooking vessel is easily deformed or destructed by the exterior impact.

SUMMARY OF THE INVENTION

Accordingly, the present invention is directed to a method for manufacturing a cooking vessel that substantially overcomes one or more of the limitations and disadvantages of the conventional art.

One object of the present invention is to provide a method for manufacturing a cooking vessel whose vessel body has a plurality of embossing parts and engraving parts on its bottom in a concavo-convex shape, thereby preventing a food from sticking during cooking.

Another object of the present invention is to provide a method for manufacturing a cooking vessel, for forming an engraving part on a bottom by erosion, thereby facilitating formation of the engraving part even on a stainless plate having an excellent strength.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided a method for manufacturing a cooking vessel having a bottom on which a plurality of engraving parts and embossing parts are formed in a concavo-convex shape. The method includes attaching a film having through-holes corresponding to the embossing parts, to a stainless plate cut in a predetermined shape; coating an ink layer on the film attached to the stainless plate, impregnating an ink of the ink layer into the through-holes of the film, peeling off the film, and forming the ink layer having the same pattern as the through-holes on a surface of the stainless plate; dipping the stainless plate having the ink layer in an erosion solution, and forming the engraving parts, by erosion, on a remnant surface of the stainless plate other than the surface of the stainless plate having the ink layer; and removing the ink layer from the stainless plate, pressing the stainless plate, and forming the vessel body having a housing part therein and having the engraving parts and the embossing parts on the bottom in the concavo-convex shape.

It is to be understood that both the foregoing summary and the following detailed description of the present invention are merely exemplary and intended for explanatory purposes only.

BRIEF DESCRIPTION OF THE DRAWINGS

The accompanying drawings, which are included to aid in understanding the invention and are incorporated into and constitute a part of this application, illustrate embodiment(s) of the invention and together with the description serve to explain the principles of the invention. In the drawings.

DETAILED DESCRIPTION OF THE INVENTION

Figure 1:
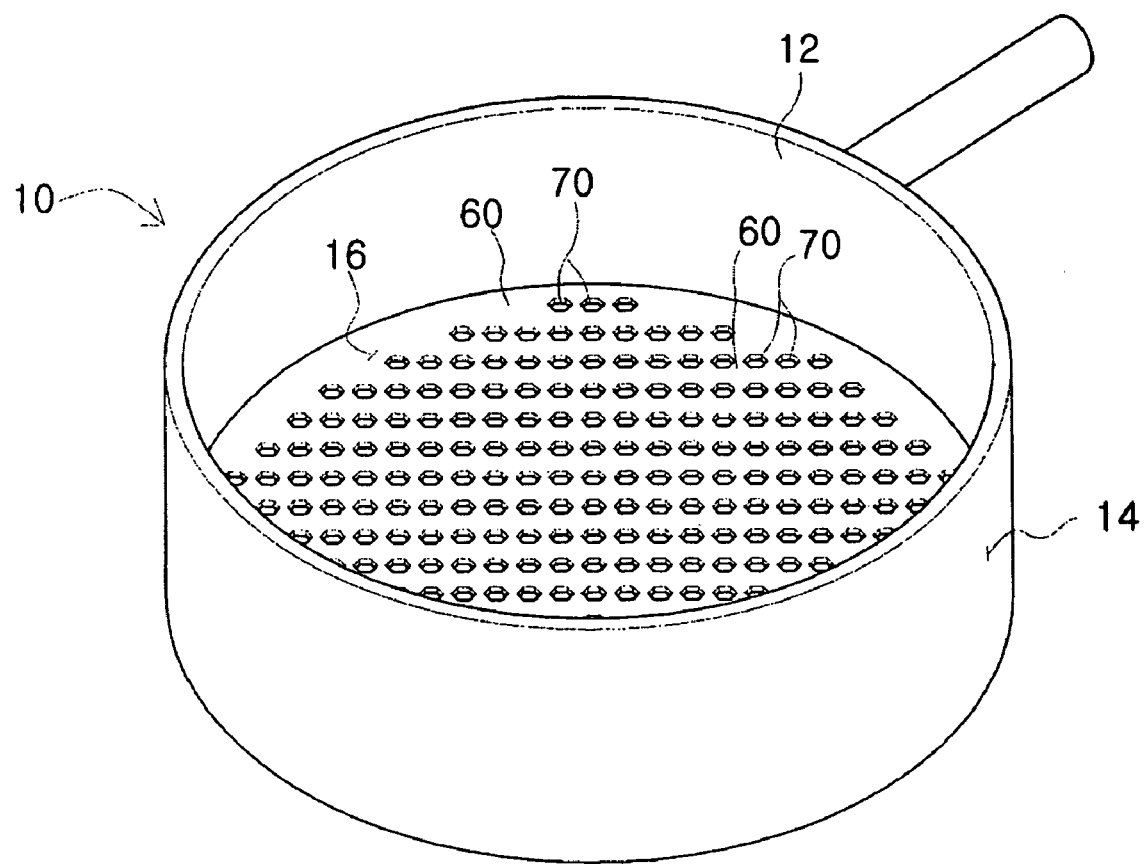
FIG. 1 is a perspective view illustrating a cooking vessel according to an exemplary embodiment of the present invention.

Reference will now be made in detail to the preferred embodiments of the present invention, examples of which are illustrated in the accompanying drawings. Wherever possible, the same reference numerals will be used throughout the drawings to refer to the same or like parts.

Figure 2:
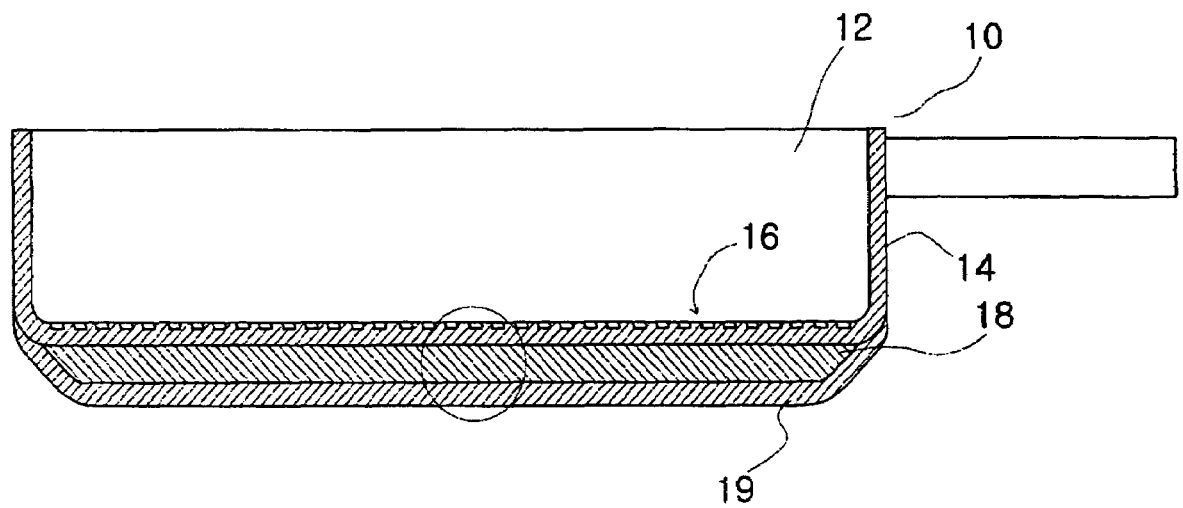
FIG. 2 is a cross-section view illustrating the cooking vessel of FIG. 1.
Figure 2:
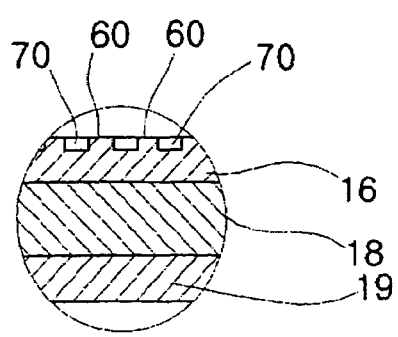

FIGS. 1 and 2 illustrate a cooking vessel according to an exemplary embodiment of the present invention.

The cooking vessel shown in FIGS. 1 and 2 is illustrated as a typical frying pan. The cooking vessel includes a vessel body 10 having a circular shaped housing part 12 therein.

A stainless plate 20 having a durability of predetermined strength or more is cut and then, is pressed in a mold such that the vessel body 10 is opened at its top and has a sidewall 14 and a bottom 16.

An aluminum plate 18 and a stainless plate 19 having the same shape as the bottom 16 are sequentially combined outside of the bottom 16 of the vessel body 10. The aluminum plate 18 has a low durability, but has a high heat conductivity and thus quickly and uniformly conducts a heat applied to the stainless plate 19, to the bottom 16 of the vessel body 10. The stainless plate 19 has a lower heat conductivity but has a higher durability than the aluminum plate 18 and reinforces a strength of the aluminum plate 18.

A plurality of engraving parts 70 and embossing parts 60 are provided in a concavo-convex shape on the bottom 16 of the vessel body 10. The concavo-convex shaped engraving parts 70 and embossing parts 60 minimize a contact between a food and the bottom 16 of the vessel body 10 and, specifically, prevent the food from sticking to the bottom 16 of the vessel body 10 during cooking by oil put in the engraving parts 70. In other words, before the food is cooked, the oil is poured in the vessel body 10 and the vessel body 10 is heated. Then, the heated oil is put in the engraving parts 70 of the bottom 16 of the vessel body 10 and then, the food is continuously heated in the vessel body 10. Then, the oil put in the engraving parts 70 is boiled, thereby generating an air bubble. At this time, the air bubble can minutely lift the food from the bottom 16 of the vessel body 10, thereby preventing the food from sticking to the bottom 16 of the vessel body 10 during the cooking.

Figure 3:
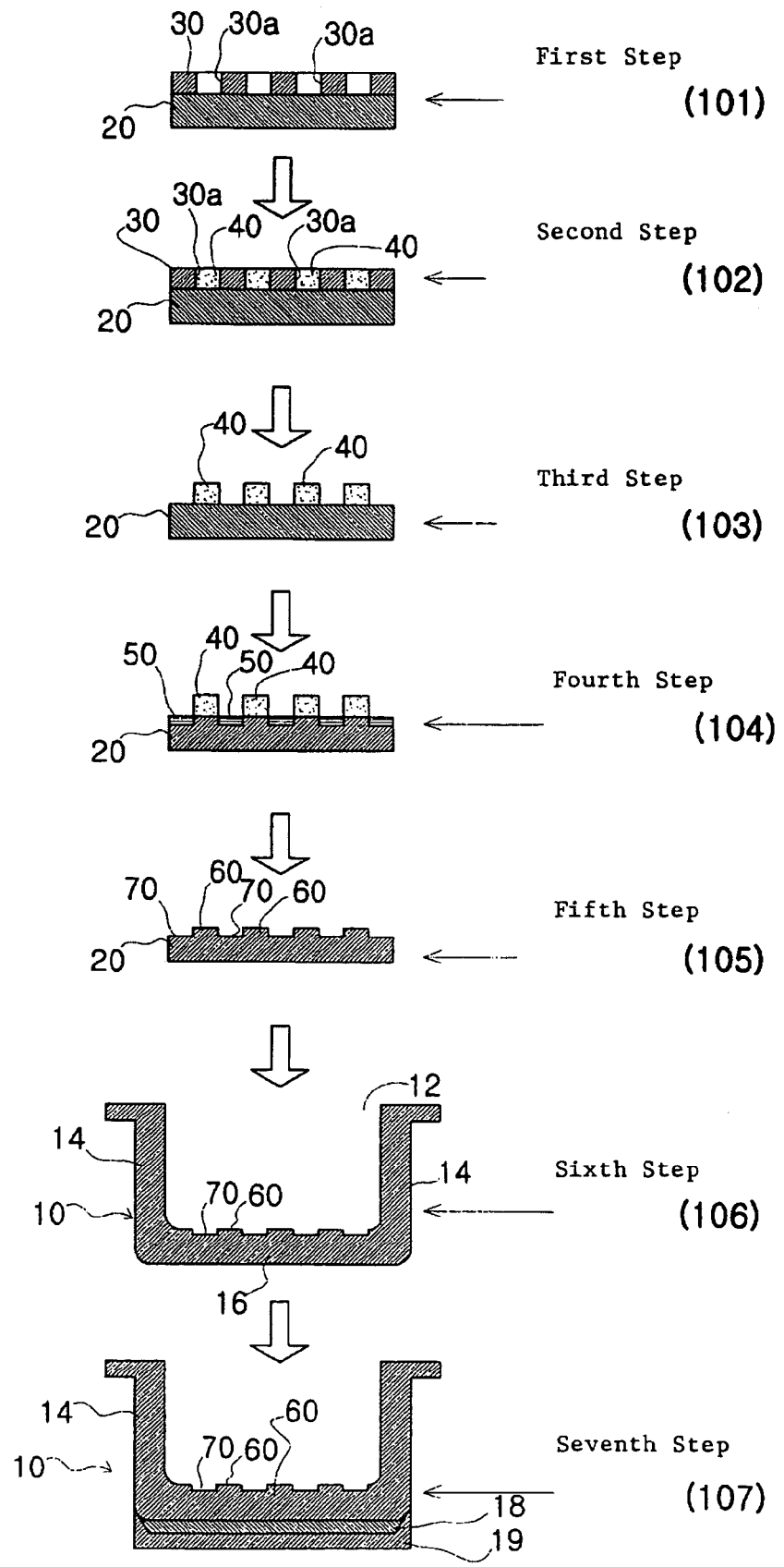
FIG. 3 is a diagram sequentially illustrating a method for manufacturing a cooking vessel whose vessel body has a plurality of embossing parts and engraving parts on its bottom in a concavo-convex shape according to the present invention.

FIG. 3 is a diagram sequentially illustrating a method for manufacturing the cooking vessel whose vessel body has the plurality of embossing parts 60 and engraving parts 70 on its bottom 16 of the vessel body 10 in the concavo-convex shape. The method for manufacturing the cooking vessel according to an exemplary embodiment of the present invention will be in detail described with reference to FIG. 3 below.

[First Step 101]

The stainless plate 20, which is a base of the vessel body 10, is cut in a circular shape. After that, a film 30 having through-holes 30a is attached to the cut stainless plate 20. The through-holes 30a of the film 30 are provided correspondingly to the engraving parts 60 to be provided on the bottom 16 of the vessel body 10. It is desirable that the film 30 used for the present invention employs a silk fabric.

[Second Step 102]

Ink 40 is coated on the film 30 attached to the stainless plate 20, and is impregnated through the through-holes 30a of the film 30. It is desirable that an ink coating method employs a method in which the ink 40 sticks to a painting roller and then, the film 30 is directly coated using the painting roller.

[Third Step 103]

The ink 40 impregnated in the through-holes 30a of the film 30 is dried for a predetermined time. After that, the film 30 is peeled off from the stainless plate 20, and the ink layer 40 having the same pattern as the through-holes 30a is provided on a surface (one surface) of the stainless plate 20.

[Fourth Step 104]

The stainless plate 20 having the ink layer 40 is dipped in an erosion solution 50 for about 30 minutes, and its surface is eroded, thereby forming the engraving parts 70. In other words, when the stainless plate 20 is dipped in the erosion solution 50, the erosion solution 50 reacts only with a surface of the stainless plate 20 not having the ink layer 40 without a reaction with a surface of the stainless plate 20 having the ink layer 40. As a result, the stainless plate 20 is eroded at its remnant surface other than the surface of the stainless plate 20 having the ink layer 40, thereby naturally forming the engraving parts 70. The used erosion solution 50 employs a FeCl3 solution to prevent its reaction with the ink layer 40.

[Fifth Step 105]

By removing the ink layer 40 from the stainless plate 20 using a cleaner such as a surfactant, the embossing parts 60 and the erosion-processed engraving parts 70 are formed in the concavo-convex shape on the surface of the stainless plate 20.

[Sixth Step 106]

After the engraving parts 70 and the embossing parts 60 are formed on the stainless plate 20, the stainless plate 20 is transferred to and pressed in the press mold. Then, the vessel body 10 is formed having the housing part 12 therein, being opened at its top, and having the bottom 14 and the sidewall 16.

[Seventh Step 107]

The aluminum plate 18 and the stainless plate 19 are again combined to the bottom of the vessel body 10, respectively, thereby completing the vessel body 10 having a triple bottom structure.

As described above, the present invention has an effect that the plurality of embossing parts and engraving parts are formed on the bottom of the cooking vessel in the concavo-convex shape, thereby preventing the food from sticking to the bottom of the cooking vessel during the cooking.

Further, the present invention has an effect that the engraving parts are formed on the bottom by erosion, thereby facilitating formation of the engraving part even on the stainless plate having an excellent strength.

While the present invention has been described with reference to exemplary embodiments thereof, it will be apparent to those skilled in the art that various modifications can be made therein without departing from the spirit and scope of the invention as defined by the appended claims and their equivalents.

What is claimed is:

1. A method for manufacturing a cooking vessel having a bottom (16) on which a plurality of engraving parts (70) and embossing parts (60) are formed in a concavo-convex shape, the method comprising steps of: attaching a film (30) having through-holes (30a) corresponding to the embossing parts (60), to a stainless plate (20) cut in a predetermined shape; coating an ink layer (40) on the film (30) attached to the stainless plate (20), impregnating an ink of the ink layer (40) into the through-holes (30a) of the film (30), peeling off the film (30), and forming the ink layer (40) having the same pattern as the through-holes (30a) on a surface of the stainless plate (20); dipping the stainless plate (20) having the ink layer (40) in an erosion solution (50), and forming the engraving parts (70), by erosion, on a remnant surface of the stainless plate (20) other than the surface of the stainless plate (20) having the ink layer (40); and removing the ink layer (40) from the stainless plate (20), pressing the stainless plate (20), and forming the vessel body (10) having a housing part (12) therein and having the engraving parts (70) and the embossing parts (60) on the bottom (16) in the concavo-convex shape.

* * * * *